(12) United States Patent
Davis et al.

(10) Patent No.: US 11,086,318 B1
(45) Date of Patent: Aug. 10, 2021

(54) SYSTEMS AND METHODS FOR A SCENARIO TAGGER FOR AUTONOMOUS VEHICLES

(71) Applicant: UATC, LLC, San Francisco, CA (US)

(72) Inventors: Steffon Charles Davis, El Cerrito, CA (US); Andrew Joel Duberstein, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 314 days.

(21) Appl. No.: 15/978,732

(22) Filed: May 14, 2018

Related U.S. Application Data

(60) Provisional application No. 62/645,978, filed on Mar. 21, 2018.

(51) Int. Cl.
*G05D 1/00* (2006.01)
*G05D 1/02* (2020.01)
*G01C 21/30* (2006.01)

(52) U.S. Cl.
CPC ........... *G05D 1/0088* (2013.01); *G01C 21/30* (2013.01); *G05D 1/0212* (2013.01); *G05D 1/0246* (2013.01); *G05D 1/0257* (2013.01); *G05D 1/0276* (2013.01); *G05D 1/0291* (2013.01); *G05D 2201/0212* (2013.01)

(58) Field of Classification Search
CPC .. G05D 1/0088; G05D 1/0276; G05D 1/0257; G05D 1/0212; G05D 1/0291; G05D 1/0246; G05D 2201/0212; G01C 21/30
USPC .......................................................... 701/27
See application file for complete search history.

(56) References Cited

U.S. PATENT DOCUMENTS

| | | | |
|---|---|---|---|
| 9,754,325 B1* | 9/2017 | Konrardy | B60W 40/09 |
| 10,019,011 B1* | 7/2018 | Green | B60W 30/0953 |
| 10,599,546 B1* | 3/2020 | Walther | G06F 11/3013 |
| 2017/0048308 A1* | 2/2017 | Qaisar | H04W 4/70 |
| 2018/0075538 A1* | 3/2018 | Konrardy | G06Q 40/08 |
| 2018/0086344 A1* | 3/2018 | Zhu | B60W 30/045 |
| 2018/0088582 A1* | 3/2018 | Kong | G05D 1/0022 |
| 2018/0107770 A1* | 4/2018 | Cahoon | G06F 30/15 |
| 2018/0203451 A1* | 7/2018 | Cronin | G05D 1/0088 |
| 2018/0237027 A1* | 8/2018 | Lundsgaard | G01M 17/007 |
| 2018/0267538 A1* | 9/2018 | Shum | G06F 30/20 |
| 2019/0084571 A1* | 3/2019 | Zhu | B60W 10/20 |
| 2019/0129831 A1* | 5/2019 | Goldberg | G06F 3/04845 |

(Continued)

*Primary Examiner* — Jonathan M Dager
*Assistant Examiner* — Jean W Charleston
(74) *Attorney, Agent, or Firm* — Dority & Manning, P.A.

(57) ABSTRACT

Systems and methods are directed to determining autonomous vehicle scenarios based on autonomous vehicle operation data. In one example, a computer-implemented method for determining operating scenarios for an autonomous vehicle includes obtaining, by a computing system comprising one or more computing devices, log data representing autonomous vehicle operations. The method further includes extracting, by the computing system, a plurality of attributes from the log data. The method further includes determining, by the computing system, one or more scenarios based on a combination of the attributes, wherein each scenario includes multiple scenario variations and each scenario variation comprises multiple features. The method further includes providing, by the computing system, the one or more scenarios for generating autonomous vehicle operation analytics.

20 Claims, 7 Drawing Sheets

(56) References Cited

U.S. PATENT DOCUMENTS

2019/0329771 A1* 10/2019 Wray .................... B60W 30/09
2020/0097003 A1* 3/2020 Wray ............... G08G 1/096725

* cited by examiner

| INFRASTRUCTURE | | AV CAPABILITY | ACTOR/OBJECT | |
|---|---|---|---|---|
| DRIVABLE REGION | PATH: LANE TYPE | MANEUVER | TYPE | MOVEMENT |
| INTERSECTION | TRAVEL LANE | LANE KEEPING | BICYCLE | DIRECTION: MOVING TOWARD / SPEED |
| INTERSECTION | TURNING LANE | TURN-RIGHT | VEHICLE | MOVING AWAY / STATIC |
| | | TURN-LEFT | PEDESTRIAN | MOVING WITH |
| | | LANE CHANGE | OTHER | |
| | | | NONE | |

SYSTEMS AND METHODS FOR A SCENARIO TAGGER FOR AUTONOMOUS VEHICLES

The present application is based on and claims the benefit of U.S. Provisional Application 62/645,978 having a filing date of Mar. 21, 2018, which is incorporated by reference herein.

FIELD

The present disclosure relates generally to operation of autonomous vehicles. More particularly, the present disclosure relates to systems and methods that provide for determining autonomous vehicle scenarios based on autonomous vehicle operation data.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for determining operating scenarios for an autonomous vehicle. The method includes obtaining, by a computing system comprising one or more computing devices, log data representing autonomous vehicle operations. The method further includes extracting, by the computing system, a plurality of attributes from the log data. The method further includes determining, by the computing system, one or more scenarios based on a combination of the attributes, wherein each scenario includes multiple scenario variations and each scenario variation comprises multiple features. The method further includes providing, by the computing system, the one or more scenarios for generating autonomous vehicle operation analytics.

Another example aspect of the present disclosure is directed to a computing system. The computing system includes one or more processors and one or more memories including instructions that, when executed by the one or more processors, cause the one or more processors to perform operations. The operations include obtaining log data representing autonomous vehicle operations. The operations further include extracting a plurality of attributes from the log data. The operations further include determining one or more scenarios based on a combination of the attributes, wherein each scenario includes multiple scenario variations and each scenario variation comprises multiple features. The operations further include providing the one or more scenarios for generating autonomous vehicle operation analytics.

Another example aspect of the present disclosure is directed to one or more tangible, non-transitory computer-readable media storing computer-readable instructions that when executed by one or more processors cause the one or more processors to perform operations. The operations include obtaining log data representing autonomous vehicle operations. The operations further include extracting a plurality of attributes from the log data. The operations further include determining one or more scenarios based on a combination of the attributes, wherein each scenario includes multiple scenario variations and each scenario variation comprises multiple features. The operations further include providing the one or more scenarios for generating autonomous vehicle operation analytics.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts an example of attribute combinations according to example embodiments of the present disclosure.

DETAILED DESCRIPTION

Figure 1:
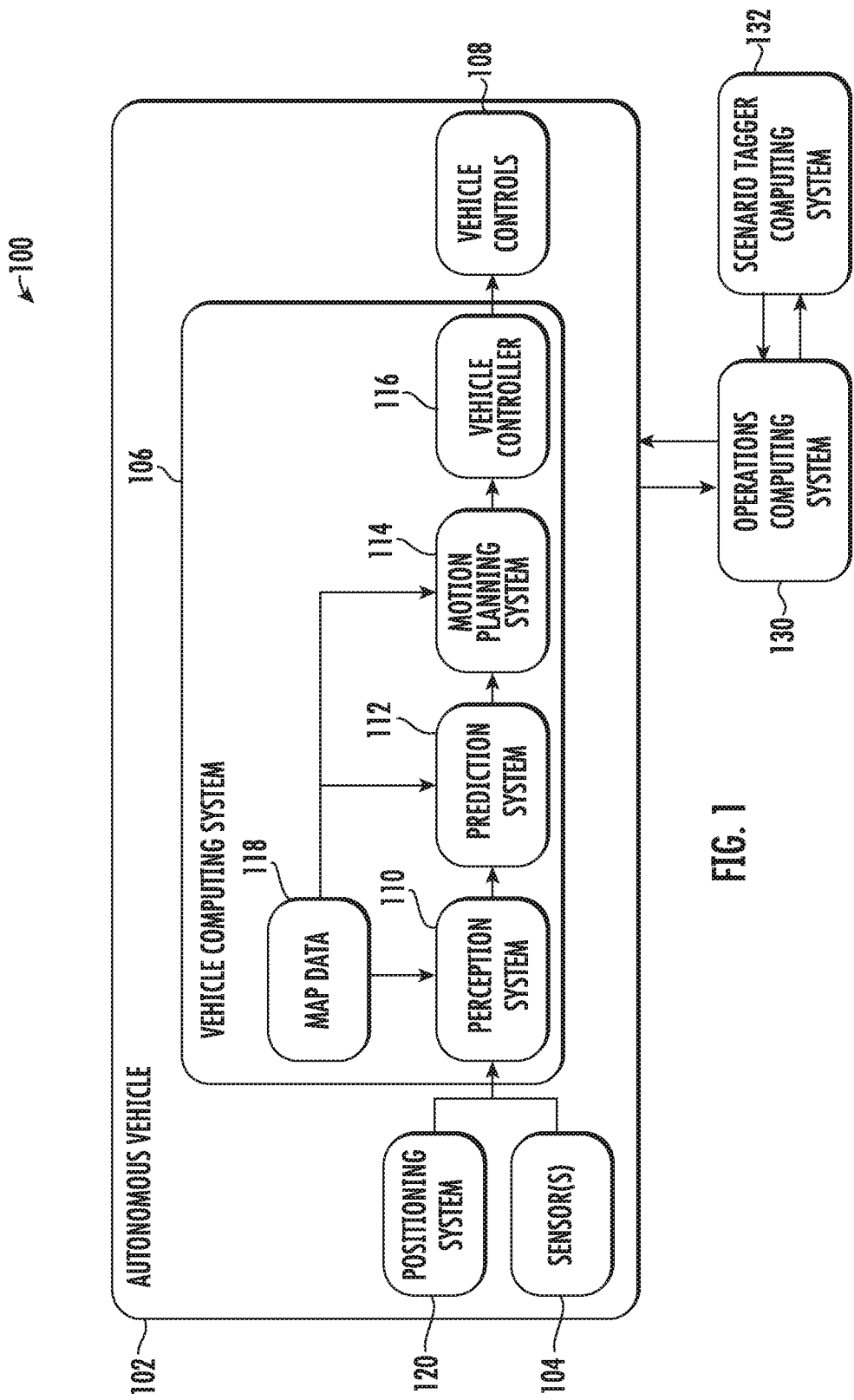
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to determining scenarios (e.g., the performing of capabilities in specific scenes with pass/fail success criteria) associated with real world and/or simulated autonomous vehicle operations. In particular, a computing system (e.g., a scenario tagger computing system) can obtain log data representing autonomous vehicle operations and extract attributes from the log data. The scenario tagger computing system can identify various scenarios based on various combinations of these attributes. For example, a scenario (e.g., a first scenario) may be a combination of the attributes "travel way: intersection", "maneuver: right turn", "actor: pedestrian", and "actor behavior: moving toward" co-occurring in the log data. As another example, a scenario (e.g., a second scenario) may be a combination of the attributes "travel way: intersection", "maneuver: right turn", "actor: pedestrian", and "actor behavior: moving away" co-occurring in the log data. The systems and methods of the present disclosure can utilize the scenarios in operating and managing an autonomous vehicle fleet, for example, for use in performance measurement, vehicle operations triage, simulation testing, and/or the like. In this way, the scenario tagger computing system can accelerate the discovery of challenge cases for autonomous vehicle operation and improve the development of simulation scenarios for use in autonomous vehicle performance measurement.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the vehicle (e.g., located on or within the autonomous vehicle). The vehicle computing system can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. The vehicle computing system can control (e.g., via a vehicle controller, etc.) one or more vehicle controls (e.g., actuators or other devices that control acceleration, throttle, steering, braking, etc.) to execute the motion plan. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles.

According to an aspect of the present disclosure, autonomous vehicles can generate logs representing a variety of autonomous vehicle operational data (e.g., sensor data, map data, perception data, prediction data, motion planning data, vehicle controller data, vehicle status data, etc.). The logs can comprise driving log data that is generated by the autonomous vehicles as the autonomous vehicles are travelling (e.g., in the real-world, in a closed test environment, etc.). The autonomous vehicles can provide the logs to a remote computing system, such as an operations computing system associated with a service provider. The operations computing system can include and/or otherwise be associated with a scenario tagger computing system that is configured to process the log data. For example, the scenario tagger computing system can obtain the log data and extract various attributes from the log data that can be used to identify a plurality of scenarios relevant to the operation of the autonomous vehicles, as further described herein. In some implementations, the log data can represent actual road operation of an autonomous vehicle, the operation of an autonomous vehicle in simulation, and/or a combination of actual road operation and simulation operation.

In some implementations, the log data may comprise numerous channels of data and the scenario tagger computing system may extract a core set of attributes from the log data that provide for the identification of scenarios. For example, in some implementations, the scenario tagger computing system may extract core attribute categories such as "travel way" (e.g., lane geometry, describing the lane context, such as travel lane, intersection, turning lane, etc.), "maneuver" (e.g., action the vehicle performs, such as right turn, left turn, lane keeping, lane change, etc.), "actors" (e.g., objects influencing the maneuver, such as, pedestrians, bicycles, vehicles, etc.), "actor behavior" (e.g., movement of the objects influencing the maneuver, such as moving toward, moving away, moving with, moving in front, etc.), and/or the like, based on the log data. In some implementations, the log data may comprise other rich data (e.g., weather conditions, road width, road gradient, turn angle, etc.) that may be stored but not used by the scenario tagger computing system in the extraction of the attributes.

In some implementations, the scenario tagger computing system may extract attributes from the log data based on one or more features identified in the log data. For example, in some cases, an attribute may be extracted based on a single feature identified in the log data, such as lane identification. In some cases, an attribute may be extracted by identifying a plurality of features in the log data that describe a particular attribute. For example, in some implementations, an attribute "maneuver: right turn" may be identified by the inclusion of both feature data indicating the presence of a right turn signal and feature data indicating a sharp steering wheel angle in the log data. In another example, the log data may include features indicating a detected object (e.g., a pedestrian), an angle of the object relative to the autonomous vehicle, speed/direction of movement of the object, and/or the like. Accordingly, the scenario tagger computing system may extract an attribute of "actor: fast moving pedestrian at the front right" based on the identified features in the log data.

In some implementations, the scenario tagger computing system may identify scenarios (combinations of attributes) in a top-down manner by searching for and identifying relevant, co-occurring attributes for known and/or common scenarios. Additionally or alternatively, in some implementations, the scenario tagger computing system may perform a bottom-up analysis to identify new combinations of attributes to determine if additional scenarios should be identified based on the new attribute combinations, for example, by tracking the distribution of new attribute combinations (e.g., by producing reports showing histograms of most occurring combinations).

In some implementations, the scenario tagger computing system may provide a rules-based approach to extracting attributes from log data and identifying scenarios. For example, in some implementations, the scenario tagger computing system may use a look-up table to extract attributes and/or to identify scenarios based on combinations of attributes. In some implementations, more sophisticated heuristic approaches may be used to extract attributes and/or identify scenarios as combinations of attributes. In some implementations, analysis can be performed on sample sets of scenario tagger outputs to refine and/or update the heuristics used by the scenario tagger computing system.

In some implementations, the scenario tagger computing system can use one or more detectors (e.g., an ambulance detector) to identify attributes in the log data. For example, a detector model (e.g., a machine-learned model) could be trained to identify particular attributes (e.g., an ambulance) in log data and allow the scenario tagger computing system to extract such attributes.

In some implementations, quality assurance can be performed to verify the accuracy of extracted attributes and/or identified scenarios. For example, in some implementations, a sample of extracted attributes and/or identified scenarios may be obtained and reviewed against the log data to analyze the accuracy of the scenario tagger computing system. In some implementations, analysis may also be performed to identify events that are not yet identified in scenarios and potentially what scenarios they could be. In some implementations, the quality assurance analysis can be used to improve the rules and/or heuristics used by the scenario tagger to identify attributes and/or scenarios.

In some implementations, other data can be used by a scenario tagger computing system for the extraction of attributes and/or the identification of scenarios, such as dash camera footage, for example. In such implementations, for example, segments can be extracted from the dash cam footage and reviewed to identify relevant attributes and/or scenarios.

According to an aspect of the present disclosure, the scenario tagger computing system can identify scenarios which can allow for enabling and/or improving a variety of tasks associated with operating an autonomous vehicle fleet. For example, in some implementations, the scenario tagger computing system can accelerate the discovery of a set of challenge cases for an operational domain. An operational domain can be indicative of an environment in which an autonomous vehicle operates. An operational domain includes the routes, constraints, and capabilities for which new autonomy software is tested against. A domain can include a series of scenes. An operational domain can be associated with an environment that autonomous vehicles should be able to reliably navigate. For example, the scenario tagger computing system can determine scenarios for an operational domain that should be prioritized for development of simulation testing (e.g., challenging cases that occur/are observed at a higher frequency). As another example, the scenario tagger computing system can facilitate the recreation of scenarios for live vehicle testing (e.g., test track testing) to measure the performance of autonomous vehicles. In a further example, identifying scenarios in an operational domain can allow for directing autonomous vehicles to more challenging geographic areas to measure performance. In some implementations, the scenario tagger computing system can enable performance measurement in an operational domain based on challenge case scenarios, for example, providing metrics to determine operational readiness and/or enabling a readiness certification platform.

In some implementations, once a scenario tagger computing system has identified baseline scenarios for an operational domain, simulation scenario variations (e.g., instances of scenarios with specific parameters) can be developed based on the baseline scenarios that provide more challenging cases to measure the performance of the autonomous vehicles. For example, a base scenario may include an intersection with a right turn maneuver with a pedestrian crossing. There can be a distribution of object (e.g., pedestrian) behavior and simulation scenarios can be developed describing some and/or all of the behavior variations, allowing for creating more extreme scenarios in simulation to measure performance.

In some implementations, the scenario tagger computing system can obtain log data across an entire fleet of vehicles and identify a multitude of instances of a scenario (e.g., hundreds of observations of a scenario across the fleet). Instances of the scenario can be slightly different, for example, having some variation in features and/or attributes that all define the same scenario. The scenario tagger computing system can provide for comparing the multiple instances of the scenario (e.g., scenario variations) to create a distribution of scenario feature values based on the variations. Such comparison of scenario variations can provide a distribution of what the scenario looks like in the real world, and, in some implementations, can be used to develop simulation testing that more accurately reflects the real world.

In some implementations, knowing the scenarios for an operational domain can enable development of full scale simulations for a region (e.g., city, etc.) to measure the performance of autonomous vehicles. In some implementations, such full-scale simulations can allow for accelerated testing of autonomous vehicles in an operational domain (e.g., one hour real time in simulation can be equivalent to 10,000 hours of city driving time). In some implementations, the scenario tagger computing system can review data from the simulations, identify the scenarios encountered, and measure performance in those scenarios.

According to another aspect of the present disclosure, attributes and/or scenarios can be used in developing training data, such as for use in training one or more machine-learned models. For example, in some implementations, measuring scenarios can allow for determining variations in objects and/or events across scenarios and allow for developing more robust training data that can be used to train machine-learned models tasked with detecting and/or predicting such objects and/or events. In another example, scenarios can be used to describe operational domains for one or more regions (e.g., cities, etc.) which can then be compared to identify different operational domains relevant to training machine-learned models to recognize objects and/or predicting behavior in one or more different regions.

According to an aspect of the present disclosure, scenarios can be used to describe the behavior of autonomous vehicles within a region (e.g., city). For example, by measuring scenarios in a particular region (e.g., city), a description of the region as observed by the autonomous vehicles can be developed. Additionally, or alternatively, measuring scenarios in the region can provide for some understanding of how various actors (e.g., pedestrians, bicycles, other vehicles, etc.) generally operate in the region, the types of situations/events observed by the autonomous vehicles, and/or the like (e.g., the operational domain for the region). By developing descriptions of various regions, regions can be compared to one another in order to determine regions where scenarios may be similar/different or where autonomous vehicles may face similar/different challenges, for example, allowing for some predictions of autonomous vehicle performance in different regions based on the performance of autonomous vehicles in other regions.

The systems and methods described herein provide a number of technical effects and benefits. For instance, the systems and methods described herein can allow for determining and prioritizing the development of scenario-based simulation testing based on real-world scenario observations, as well as provide for more robust data by allowing for the identification of more variations for a specific scenario. The systems and methods described herein can accelerate the identification of challenges for autonomous vehicle operation by allowing analysis of scenarios across a vehicle fleet. The systems and methods described herein can also enable improved development feedback for solutions to challenges by providing consistent and faster measurement of scenarios.

In addition, the systems and methods described herein can provide the technical effect and benefit of labeling data programmatically across logs to add scale and consistency and reduce the resources required for labeling.

With reference to the figures, example embodiments of the present disclosure will be discussed in further detail.

FIG. 1 depicts a block diagram of an example system 100 for controlling the navigation of an autonomous vehicle 102 according to example embodiments of the present disclosure. The system 100 can include a vehicle computing system 106 associated with the autonomous vehicle 102. In some implementations, the system 100 can include an operations computing system 130 that is remote from the autonomous vehicle 102.

The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode, semi-autonomous operational mode, and/or a non-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle. The vehicle 102 can enter into a non-autonomous operational mode in which the vehicle 102 is fully controllable by a human operator (e.g., human driver, pilot, etc.) and can be prohibited and/or disabled (e.g., temporary, permanently, etc.) from performing autonomous navigation (e.g., autonomous driving). In some implementations, the vehicle 102 can implement vehicle operating assistance technology (e.g., collision mitigation system, power assist steering, etc.) while in the non-autonomous operational mode to help assist the human operator of the vehicle 102.

The autonomous vehicle 102 can include one or more sensors 104, a vehicle computing system 106, and one or more vehicle controls 108. The vehicle computing system 106 can include one or more computing devices and include various subsystems that can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

Additionally, in some implementations, the vehicle computing system 106 can communicate with various data acquisition systems, autonomy systems, and/or vehicle control systems onboard the autonomous vehicle and obtain data indicative of one or more operations associated with the vehicle. The vehicle computing system can be configured to generate logs of the data associated with the vehicle. The vehicle computing system 106 can provide the log data to a remote computing system, such as the operations computing system 130.

In some implementations, vehicle computing system 106 can include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travel ways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that within the surrounding environment of the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; uncertainties associated therewith, and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that within the surrounding environment of the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. For example, the prediction system 112 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction system 112 predicts the speed and/or acceleration at which the respective object is predicted to travel along its associated predicted motion trajectory. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112, the state data for the object provided by the perception system 110 and/or other data. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations. The motion plan can include one or more vehicle trajectories that indicate how the vehicle 102 is to travel over a certain time period, distance, etc. This can indicate a vehicle heading, speed, acceleration, and/or other motion parameters. The motion planning system 114 can be configured to select a vehicle trajectory for implementation by the autonomous vehicle 102 to control its motion.

As one example, in some implementations, the motion planning system 114 can determine a cost function for each of one or more candidate vehicle trajectories for the autonomous vehicle 102 based at least in part on the current locations and/or predicted future locations of the objects. For example, the cost function can describe a cost (e.g., over time) of adhering to a particular candidate trajectory. For example, the cost described by a cost function can increase when the autonomous vehicle 102 approaches a possible impact with another object and/or deviates from a preferred pathway (e.g., a predetermined travel route).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

In some implementations, the autonomous vehicle 102 can be associated with an entity (e.g., a service provider, owner, manager). The entity can be one that offers one or more vehicle service(s) to a plurality of users via a fleet of vehicles that includes, for example, the autonomous vehicle 102. In some implementations, the operations computing system 130 can be associated with the entity. The entity can utilize the operations computing system 130 to coordinate and/or manage the autonomous vehicle 102 (and its associated fleet, if any) to provide the vehicle services to users.

The operations computing system 130 can include one or more computing devices that are remote from the autonomous vehicle 102 (e.g., located off-board the vehicle 102). For example, such computing device(s) can be components of a cloud-based server system and/or other type of computing system that can communicate with the vehicle computing system 106 of the autonomous vehicle 102. The computing device(s) of the operations computing system 130 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 130 (e.g., the one or more processors, etc.) to perform operations and functions, such as providing data to and/or receiving data from the autonomous vehicle 102, for managing a fleet of vehicles (that includes the autonomous vehicle 102), etc.

In some implementations, a scenario tagger computing system 132 can be associated with or included within the operations computing system 130. As further described herein, the scenario tagger computing system 132 can obtain log data representing autonomous vehicle operations and extract a plurality of attributes from the log data. The scenario tagger computing system 132 can identify various scenarios based on various combinations of these attributes and provide the scenarios for use in operating and managing an autonomous vehicle fleet, for example, for use in performance measurement, vehicle operations triage, simulation testing, and/or the like.

In some implementations, the scenario tagger computing system 132 be remote from the operating computing system 130 and can include one or more computing devices. For example, such computing device(s) can be components of a cloud-based server system and/or other type of computing system that can communicate with the operations computing system 130. The computing device(s) of the scenario tagger computing system 132 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the scenario tagger computing system 132 (e.g., the one or more processors, etc.) to perform operations and functions, such as obtaining log data representing autonomous vehicle operations, extracting a plurality of attributes from the log data, and identifying various scenarios based on various combinations of these attributes.

Figure 2:
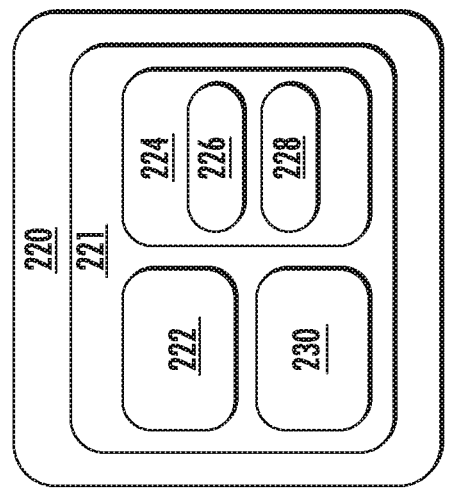
FIG. 2 depicts a block diagram of an example computing system according to example embodiments of the present disclosure.
Figure 2:
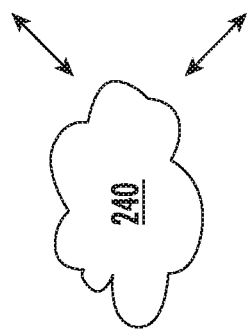
Figure 2:
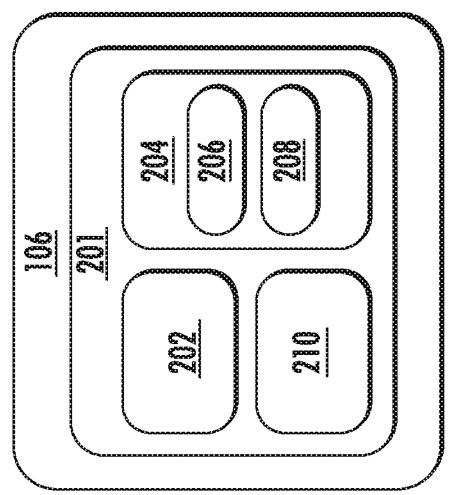

FIG. 2 depicts a block diagram of an example computing system 200 according to example embodiments of the present disclosure. The example system 200 illustrated in FIG. 2 is provided as an example only. The components, systems, connections, and/or other aspects illustrated in FIG. 2 are optional and are provided as examples of what is possible, but not required, to implement the present disclosure. The example system 200 can include the vehicle computing system 106 of the autonomous vehicle 102 and a remote computing system 220 (e.g., operations computing system, etc. that is remote from the vehicle 102) that can be communicatively coupled to one another over one or more network(s) 240. The remote computing system 220 can be and/or include the operations computing system 130 and/or scenario tagger computing system 132. The remote computing system 220 can be associated with a central operations system and/or an entity associated with the vehicle 102 such as, for example, a vehicle owner, vehicle manager, fleet operator, service provider, etc. For instance, the remote computing system 220 can be or otherwise include the remote computing system 130 described herein.

The computing device(s) 201 of the vehicle computing system 106 can include processor(s) 202 and at least one memory 204. The one or more processors 202 can be any suitable processing device (e.g., a processor core, a microprocessor, an ASIC, a FPGA, a controller, a microcontroller, etc.) and can be one processor or a plurality of processors that are operatively connected. The memory 204 can include one or more non-transitory computer-readable storage media, such as RAM, ROM, EEPROM, EPROM, one or more memory devices, flash memory devices, magnetic disks, data registers, etc., and combinations thereof.

The memory 204 can store information that can be accessed by the one or more processors 202. For instance, the memory 204 (e.g., one or more non-transitory computer-readable storage mediums, memory devices) can include computer-readable instructions 206 that can be executed by the one or more processors 202. The instructions 206 can be software written in any suitable programming language or can be implemented in hardware. Additionally, or alternatively, the instructions 206 can be executed in logically and/or virtually separate threads on processor(s) 202.

For example, the memory 204 on-board the vehicle 102 can store instructions 206 that when executed by the one or more processors 202 cause the one or more processors 202 (e.g., in the vehicle computing system 106) to perform operations such as any of the operations and functions of the computing device(s) 201 and/or vehicle computing system 106, any of the operations and functions for which the vehicle computing system 106 is configured, and/or any other operations and functions of the vehicle computing system 106, as described herein.

The memory 204 can store data 208 that can be obtained (e.g., received, accessed, written, manipulated, created, generated, etc.) and/or stored. The data 208 can include, for instance, services data (e.g., trip data, user data, etc.), sensor data, map data, perception data, prediction data, motion planning data, object states and/or state data, object motion trajectories, feedback data, fault data, log data, and/or other data/information as described herein. In some implementations, the computing device(s) 201 can obtain data from one or more memories that are remote from the autonomous vehicle 102.

The computing device(s) 201 can also include a communication interface 210 used to communicate with one or more other system(s) (e.g., the remote computing system 220). The communication interface 210 can include any circuits, components, software, etc. for communicating via one or more networks (e.g., network(s) 240). In some implementations, the communication interface 210 can include, for example, one or more of a communications controller, receiver, transceiver, transmitter, port, conductors, software, and/or hardware for communicating data.

The remote computing system 220 can include one or more computing device(s) 221. The computing device(s) 221 can include one or more processors 222 and at least one memory 224. The one or more processors 222 can be any suitable processing device (e.g., a processor core, a microprocessor, an ASIC, a FPGA, a controller, a microcontroller, etc.) and can be one processor or a plurality of processors that are operatively connected. The memory 224 can include one or more tangible, non-transitory computer-readable storage media, such as RAM, ROM, EEPROM, EPROM, one or more memory devices, flash memory devices, data registers, etc., and combinations thereof.

The memory 224 can store information that can be accessed by the one or more processors 222. For instance, the memory 224 (e.g., one or more tangible, non-transitory computer-readable storage media, one or more memory devices, etc.) can include computer-readable instructions 226 that can be executed by the one or more processors 222. The instructions 226 can be software written in any suitable programming language or can be implemented in hardware. Additionally, or alternatively, the instructions 226 can be executed in logically and/or virtually separate threads on processor(s) 222.

For example, the memory 224 can store instructions 226 that when executed by the one or more processors 222 cause the one or more processors 222 to perform operations such as any of the operations and functions of the operations computing system 130, the scenario tagger computing system 132, the remote computing system 220 and/or computing device(s) 221 or for which any of these computing systems are configured, as described herein, and/or any other operations and functions described herein.

The memory 224 can store data 228 that can be obtained and/or stored. The data 228 can include, for instance, services data (e.g., trip data, user, data etc.), data associated with autonomous vehicles (e.g., vehicle data, maintenance data, ownership data, sensor data, map data, perception data, prediction data, motion planning data, object states and/or state data, object motion trajectories, feedback data, fault data, log data, etc.), inventory data, scheduling data, log data, attribute data, scenario data, training data, and/or other data/information as described herein. In some implementations, the computing device(s) 221 can obtain data from one or more memories that are remote from the remote computing system 220.

The computing device(s) 221 can also include a communication interface 230 used to communicate with one or more other system(s) (e.g., the vehicle computing system 106, etc.). The communication interface 230 can include any circuits, components, software, etc. for communicating via one or more networks (e.g., network(s) 240). In some implementations, the communication interface 230 can include, for example, one or more of a communications controller, receiver, transceiver, transmitter, port, conductors, software, and/or hardware for communicating data.

The network(s) 240 can be any type of network or combination of networks that allows for communication between devices. In some embodiments, the network(s) 240 can include one or more of a local area network, wide area network, the Internet, secure network, cellular network, mesh network, peer-to-peer communication link, and/or some combination thereof, and can include any number of wired or wireless links. Communication over the network(s) 240 can be accomplished, for instance, via a communication interface using any type of protocol, protection scheme, encoding, format, packaging, etc.

Figure 3:
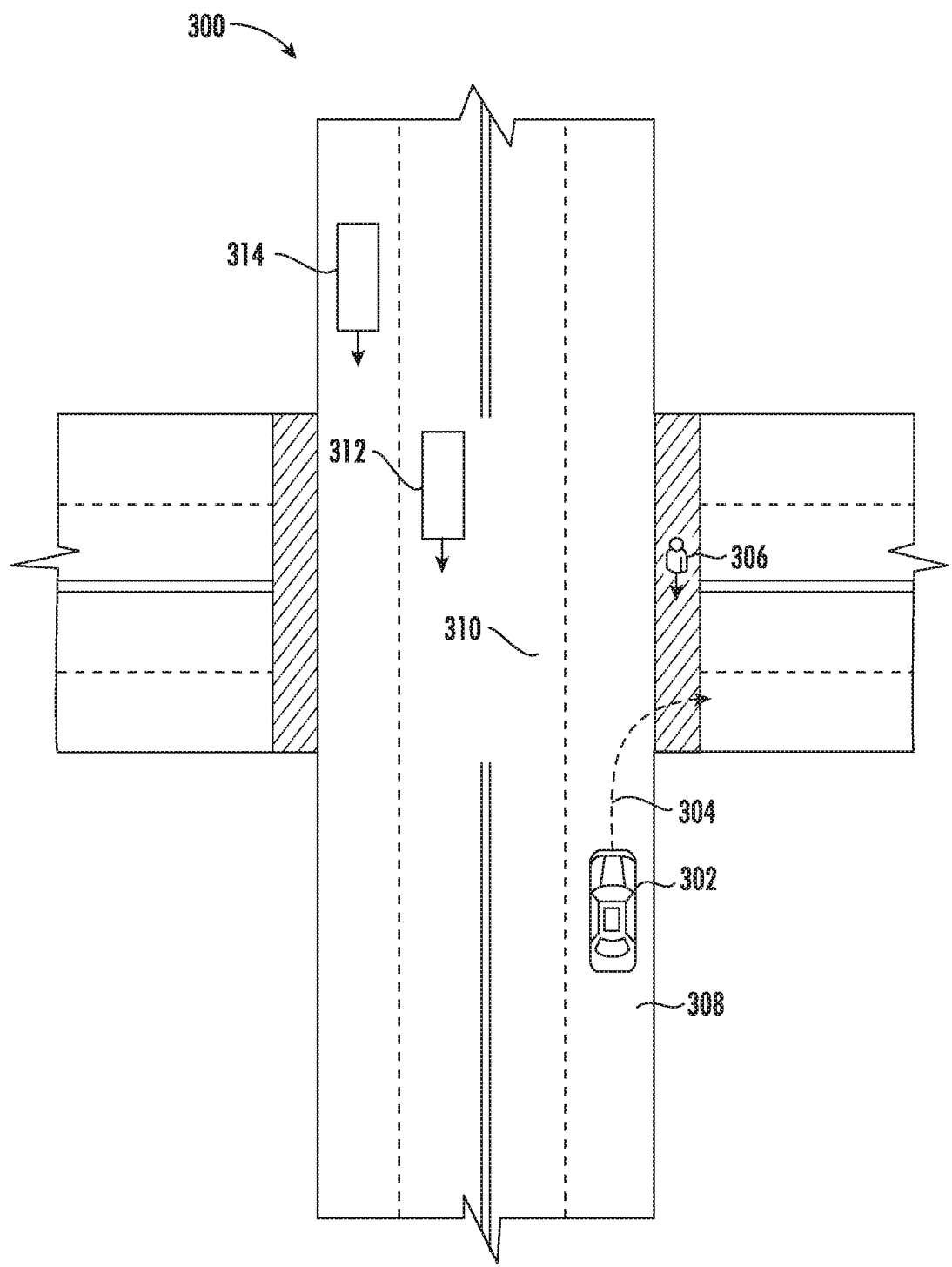
FIG. 3 depicts an example environment where an autonomous vehicle may operate and generate log data according to example embodiments of the present disclosure.

FIG. 3 depicts an example environment 300 where an autonomous vehicle may operate and generate log data according to example embodiments of the present disclosure. As illustrated in FIG. 3, an autonomous vehicle 302 may operate (e.g., provide one or more services) on various travel ways, such as travel way 308. During operation of the autonomous vehicle (e.g., on real world travel ways and/or in simulation), the autonomous vehicle 302 may generate and/or capture a variety of data associated with the operation of the autonomous vehicle 302 and the surrounding environment. In some implementations, the autonomous vehicle 302 (e.g., via an on-board vehicle computing system and/or the like) may generate and store log data based on the data generated and/or captured during the operation of the autonomous vehicle.

In some implementations, the autonomous vehicle can store log data regarding the operation of the autonomous vehicle 302, such as data describing the current travel way 308, data describing an upcoming travel way, such as intersection 310, data describing a current and/or upcoming maneuver of the autonomous vehicle, such as right turn 304, and/or the like. In some implementations, the autonomous vehicle can store log data regarding one or more objects in the surrounding environment, such as pedestrian 306, other vehicles 312 and 314, and/or the like. In some implementations, the autonomous vehicle 302 can provide the log data to another computing system (e.g., a remote operations computing system, etc.) for use in identifying a plurality of scenarios associated with the operation of autonomous vehicles, as described herein.

Figure 4:
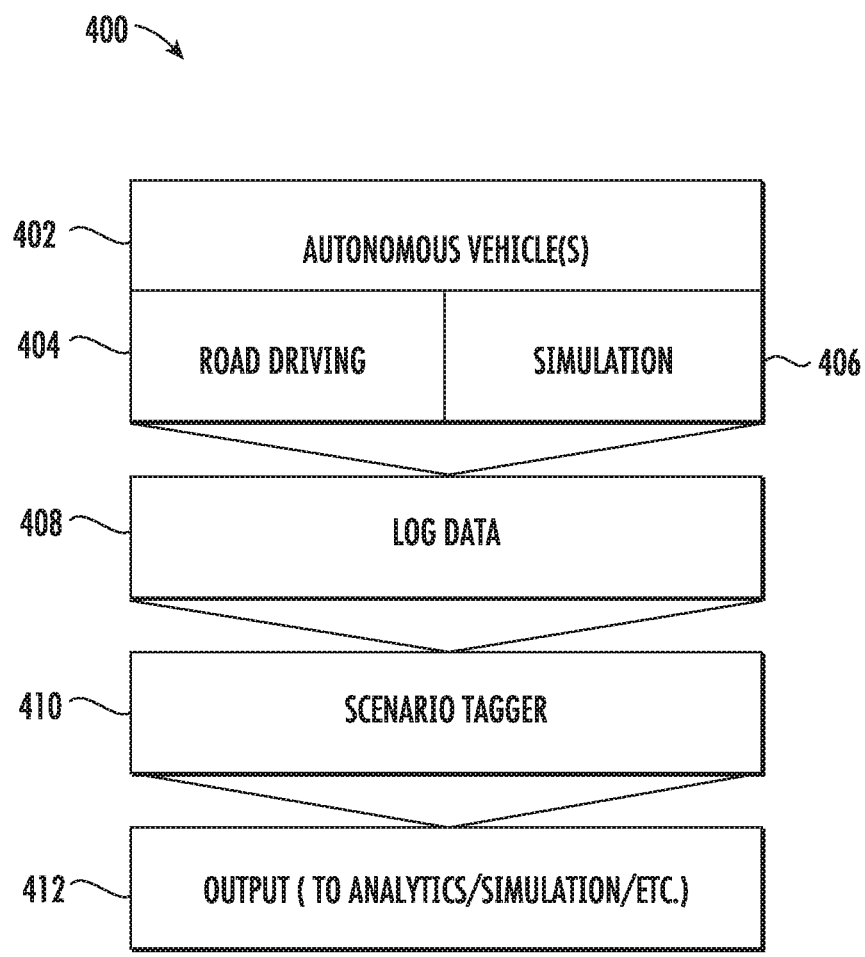
FIG. 4 depicts a block diagram of a scenario tagger computing system according to example embodiments of the present disclosure.

FIG. 4 depicts a block diagram 400 of a scenario tagger computing system according to example embodiments of the present disclosure. As illustrated in FIG. 4, one or more autonomous vehicles 402 may generate data in actual road driving 404 and/or in simulation 406. The autonomous vehicles may generate log data 408 representing the road driving operations 404 and/or simulation operations 406 of the autonomous vehicle. For example, in some implementations, one or more autonomous vehicles can be operated in a real world environment, such as illustrated in FIG. 3. The autonomous vehicle(s) (e.g., autonomous vehicle 302, etc.) can generate log data representing the current travel way (e.g., travel way 308, intersection 310, etc.), one or more actors (e.g., pedestrian 306, other vehicles 312, 314, etc.), vehicle operations (e.g. right turn maneuver 304, etc.), and/or the like.

The log data 408 may be provided to a scenario tagger computing system 410 which can extract a plurality of attributes from the log data 408. The scenario tagger computing system 132 of FIG. 1 can be configured in a similar or same manner as that of scenario tagger computing system 410. In some implementations, the log data 408 may comprise numerous types of data (e.g., sensor data, map data, perception data, prediction data, motion planning data, vehicle controller data, vehicle status data, etc.) and the scenario tagger system 410 may extract a core set of attributes from the log data 408 that provide for the identification of scenarios. For example, in some implementations, the scenario tagger computing system 410 may extract core attribute categories such as "travel way" (e.g., lane geometry, describing the lane context, such as travel lane, intersection, turning lane, etc.), "maneuver" (e.g., action the vehicle performs, such as right turn, left turn, lane keeping, lane change, etc.), "actors" (e.g., objects influencing the maneuver, such as, pedestrians, bicycles, vehicles, etc.), "actor behavior" (e.g., movement of the objects influencing the maneuver, such as moving toward, moving away, moving with, moving in front, etc.), and/or the like.

In some implementations, the scenario tagger computing system 410 may extract attributes from the log data 408 based on one or more features identified in the log data 408. For example, in some cases, an attribute may be extracted based on a single feature identified in the log data 408, such as a lane identification. In some cases, an attribute may be extracted by identifying a plurality of features in the log data 408 that describe a particular attribute. For example, in some implementations, an attribute "maneuver: right turn" may be identified by the inclusion of both feature data indicating the presence of a right turn signal and feature data indicating a sharp steering wheel angle in the log data. In another example, the log data 408 may include features indicating a detected object (e.g., a pedestrian), an angle of the object relative to the autonomous vehicle, speed/direction of movement of the object, and/or the like. Accordingly, the scenario tagger system 410 may extract an attribute of "actor: fast moving pedestrian at the front right" based on these identified features in the log data 408.

The scenario tagger computing system 410 can identify various autonomous vehicle scenarios (e.g., the performing of capabilities in specific scenes with pass/fail success criteria) based on combinations of the attributes co-occurring in the log data. For example, a first scenario may be a combination of the attributes "travel way: intersection", "maneuver: right turn", "actor: pedestrian", and "actor behavior: moving toward" co-occurring in the log data. As another example, a second scenario may be a combination of the attributes "travel way: intersection", "maneuver: right turn", "actor: pedestrian", and "actor behavior: moving away" co-occurring in the log data. In some implementations, scenarios can be log based (Log Sim), for example, a triage event or structured test on a track, or simulation based (Virtual Sim). A single scenario can have both Log Sim and Virtual Sim variations.

The scenario tagger computing system 410 can provide the identified scenarios as output 412 for use in operating and managing an autonomous vehicle fleet, for example, for use in performance measurement, vehicle operations triage, simulation testing, and/or the like. For example, the scenario tagger system 410 can identify scenarios which can allow for enabling and/or improving a variety of tasks associated with operating an autonomous vehicle fleet. As an example, in some implementations, the scenario tagger system 410 can accelerate the discovery of a set of challenge cases for an operational domain. An operational domain can be indicative of an environment in which an autonomous vehicle operates. This can include, for example, the types of travel ways, types/behavior of objects encountered, etc., in a region, city, and/or the like.

An operational domain can be associated with an environment that autonomous vehicles should be able to reliably navigate. For example, the scenario tagger system 410 can determine scenarios for an operational domain that should be prioritized for development of simulation testing (e.g., challenging cases that occur/are observed at a higher frequency). As another example, the scenario tagger system 410 can facilitate the recreation of scenarios for live vehicle testing (e.g., test track testing) to measure the performance of autonomous vehicles. In a further example, identifying scenarios in an operational domain can allow for directing autonomous vehicles to more challenging geographic areas to measure performance. In some implementations, the scenario tagger system 410 can enable performance measurement in an operational domain based on challenge case scenarios, for example, providing metrics to determine operational readiness and/or enabling a readiness certification platform.

Figure 5:
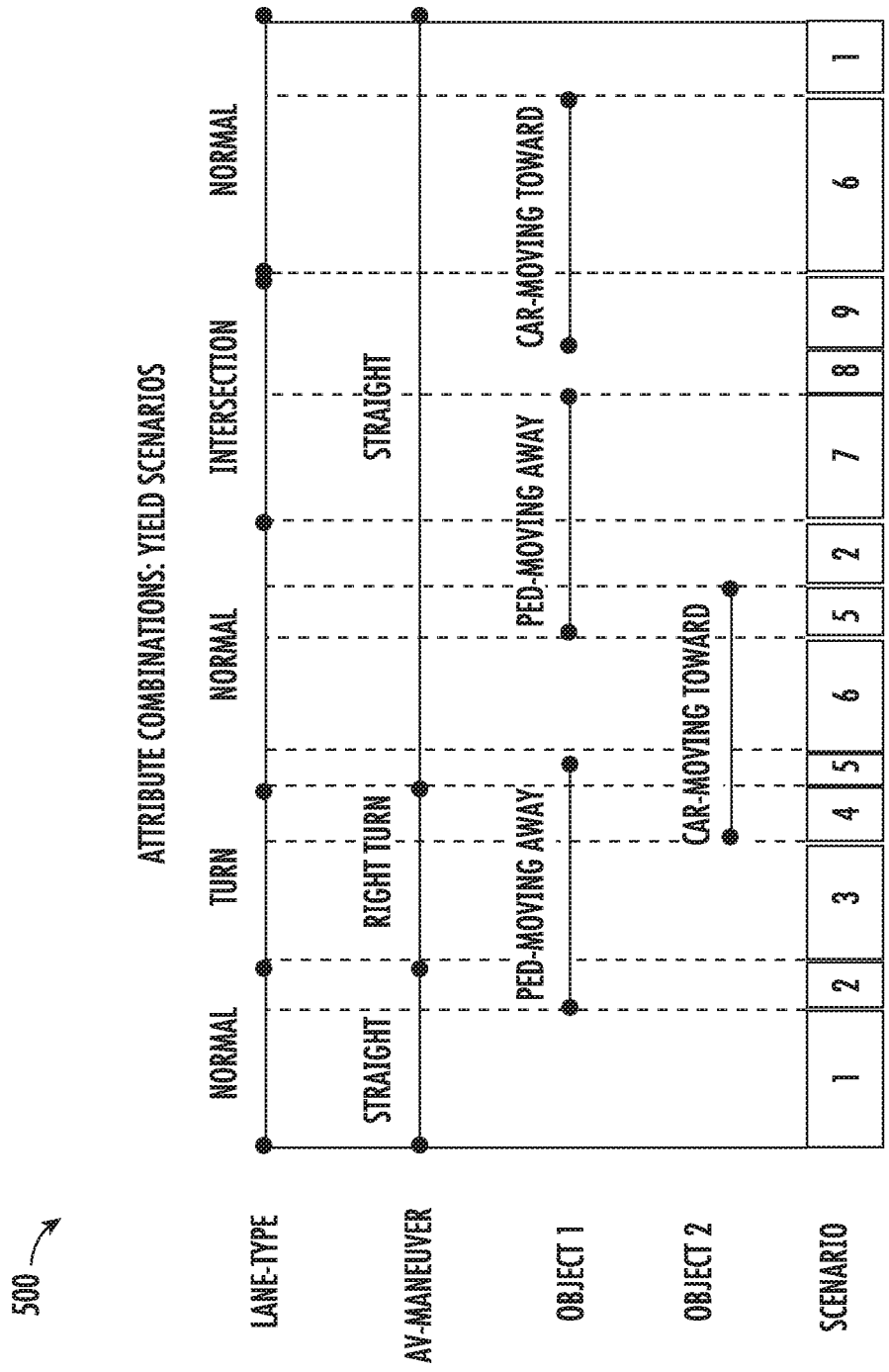
FIG. 5 depicts an example of attribute combinations in a time series that define one or more scenarios according to example embodiments of the present disclosure.

FIG. 5 depicts an example of attribute combinations in a time series 500 that define one or more scenarios according to example embodiments of the present disclosure. As illustrated in FIG. 5, time series 500 depicts a number of combinations of example attribute types (e.g., Lane-type, AV-maneuver, Object 1, and Object 2) that can be extracted from log data of autonomous vehicle operations. The extracted attributes are depicted in time series 500 illustrating their co-occurrence in the log data. For example, as illustrated, a first example scenario (e.g., scenario 1) is depicted as a combination of the attributes Lane-type: normal and AV-maneuver: straight.

A second example scenario (e.g., scenario 2) is depicted as a combination of the attributes Lane-type: normal, AV-maneuver: straight, and Object-1: pedestrian moving away.

A third example scenario (e.g., scenario 3) is depicted as a combination of the attributes Lane-type: turn, AV-maneuver: right turn, and Object-1: pedestrian moving away.

A fourth example scenario (e.g., scenario 4) is depicted as a combination of the attributes Lane-type: turn, AV-maneuver: right turn, Object-1: pedestrian moving away, and Object-2: car moving toward.

A fifth example scenario (e.g., scenario 5) is depicted as a combination of the attributes Lane-type: normal, AV-maneuver: straight, Object-1: pedestrian moving away, and Object-2: car moving toward.

A sixth example scenario (e.g., scenario 6) is depicted as a combination of the attributes Lane-type: normal, AV-maneuver: straight, and Object-2: car moving toward.

A seventh example scenario (e.g., scenario 7) is depicted as a combination of the attributes Lane-type: intersection, AV-maneuver: straight, and Object-1: pedestrian moving away.

An eighth example scenario (e.g., scenario 8) is depicted as a combination of the attributes Lane-type: intersection and AV-maneuver: straight.

A ninth example scenario (e.g., scenario 9) is depicted as a combination of the attributes Lane-type: intersection, AV-maneuver: straight, and Object-1: car moving toward.

FIG. 6 depicts an example table 600 of attribute combinations according to example embodiments of the present disclosure. As illustrated in FIG. 6, attribute combination table 600 depicts example extracted attribute types including drivable region (e.g., travel lane, turning lane, intersection, etc.), maneuver (e.g., lane keeping, turn right, turn left, lane change, etc.), actor/object type (e.g., bicycle, vehicle, pedestrian, other, etc.), and actor/object movement (moving toward, moving away, moving with, etc.). In some implementations, the extracted attributes for drivable region can include data representing the lane type (e.g., travel lane, turning lane, etc.) and whether the drivable region is an intersection. In some implementations, the extracted attributes for actor movement can include data representing the direction of the actor/object movement (e.g., moving toward vehicle, moving away from vehicle, moving with vehicle, etc.) and a speed of the actor/object movement.

Figure 7:
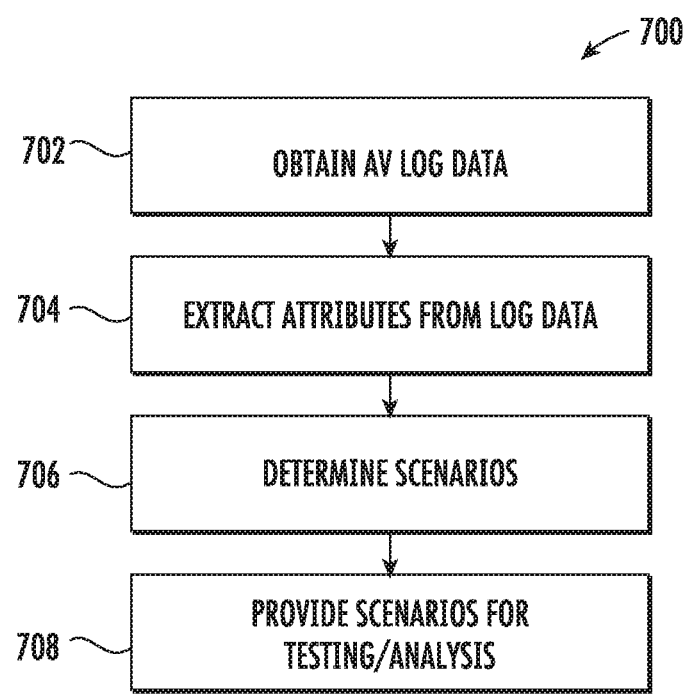
FIG. 7 depicts a flowchart diagram of example operations for determining scenarios according to example embodiments of the present disclosure.

FIG. 7 depicts a flowchart diagram of some example operations 700 for a identifying a plurality of scenarios, such as by a scenario tagger computing system (e.g., scenario tagger computing system 132 of FIG. 1 and/or the like), according to example embodiments of the present disclosure. As described herein, in some implementations, a scenario tagger computing system can extract a plurality of attributes from log data obtained from autonomous vehicles. The scenario tagger computing system can provide for identifying one or more scenarios based on one or more combinations of attributes co-occurring in the log data. One or more portion(s) of the operations 700 can be implemented by one or more computing devices such as, for example, the vehicle computing system 106 of FIG. 1 or 2, the operations computing system 130 of FIG. 1, the remote computing system 220 of FIG. 2, the scenario tagger computing system 132/410 of FIGS. 1/4, and/or the like. Each respective portion of the operations 700 can be performed by any (or any combination) of the one or more computing devices. Moreover, one or more portion(s) of the operations 700 can be implemented as an algorithm on the hardware components of the device(s) described herein (e.g., as in FIGS. 1 and 2), for example, to provide for identification of autonomous vehicle scenarios as described herein. FIG. 7 depicts elements performed in a particular order for purposes of illustration and discussion and is not meant to be limiting.

At 702, one or more computing devices included within a computing system (e.g., computing system 106, 130, 132, 220, and/or the like) can obtain log data from one or more autonomous vehicles. For example, in some implementations, autonomous vehicles can generate and/or capture various operational data regarding the operation of the autonomous vehicle and/or the surrounding environment (e.g., sensor data, map data, perception data, prediction data, motion planning data, vehicle controller data, vehicle status data, etc.) and generate logs representing the operational data. In some implementations, the log data can represent actual road operation of an autonomous vehicle, the operation of an autonomous vehicle in simulation, and/or a combination of actual road operation and simulation operation. The computing system can obtain such log data from one or more of the autonomous vehicles.

At 704, the computing system can, extract a plurality of attributes from the log data. For example, in some implementations, the computing system can extract various attributes from the log data that can be used in identifying a plurality of scenarios relevant to the operation of autonomous vehicles. In some implementations, the computing system can extract a core set of attribute types from the log data that provide for the identification of scenarios. For example, in some implementations, the computing system can extract core attribute categories such as "travel way" (e.g., lane geometry, describing the lane context, such as travel lane, intersection, turning lane, etc.), "maneuver" (e.g., action the vehicle performs, such as right turn, left turn, lane keeping, lane change, etc.), "actors" (e.g., objects influencing the maneuver, such as, pedestrians, bicycles, vehicles, etc.), "actor behavior" (e.g., movement of the objects influencing the maneuver, such as moving toward, moving away, moving with, moving in front, etc.), and/or the like, based on the log data.

In some implementations, the computing system may extract attributes from the log data based on one or more features identified in the log data. For example, in some cases, an attribute may be extracted based on a single feature identified in the log data, such as lane identification. In some cases, an attribute may be extracted by identifying a plurality of features in the log data that describe a particular attribute, as described above.

At 706, the computing system can identify one or more scenarios based on combinations of the attributes. For example, in some implementations, the computing system can identify various scenarios based on various combinations of these extracted attributes. As an example, one scenario may be a combination of the extracted attributes "travel way: intersection", "maneuver: right turn", "actor: pedestrian", and "actor behavior: moving toward" co-occurring in the log data. As another example, another scenario may be a combination of the extracted attributes "travel way: intersection", "maneuver: right turn", "actor: pedestrian", and "actor behavior: moving away" co-occurring in the log data.

In some implementations, the computing system can obtain log data across an entire fleet of vehicles and identify a multitude of instances of particular scenarios (e.g., hundreds of observations of a scenario across the fleet). Instances of a scenario can be slightly different, for example, having some variation in features and/or attributes that all define a same scenario. The computing system can provide for comparing the multiple instances of a scenario (e.g., the scenario variations) to create a distribution of scenario feature values based on the variations. Such comparison of scenario variations can provide a distribution of what a scenario looks like in the real world.

At 708, the computing system can, provide one or more scenarios for use in autonomous vehicle testing and/or analytics. For example, in some implementations, the computing system can provide scenarios for use in operating and managing an autonomous vehicle fleet, for example, for use in performance measurement, vehicle operations triage, simulation testing, and/or the like.

As an example, the computing system can provide identified scenarios which can allow for enabling and/or improving a variety of tasks associated with operating an autonomous vehicle fleet. For instance, in some implementations, the computing system provide identified scenarios which can accelerate the discovery of a set of challenge cases for an operational domain and assist in determining the scenarios for an operational domain that should be prioritized for development of simulation testing (e.g., challenging cases that occur/are observed at a higher frequency).

As another example, the computing system can provide scenarios to facilitate the recreation of particular scenarios for live vehicle testing (e.g., test track testing) to measure the performance of autonomous vehicles. In some implementations, the computing system can provide identified scenarios that can enable performance measurement in an operational domain based on challenge case scenarios, for example, providing metrics to determine operational readiness and/or enabling a readiness certification platform.

In some implementations, the computing system can identify all scenarios in an autonomous operation set that are in scope for achieving autonomous operation on an operational domain. This can be used to report autonomy performance and guide development efforts. From this autonomous operation set, a set of regression scenarios (e.g., a "Golden Set") can be developed that a new software release is expected to pass. This can ensure that each software release meets a minimum standard of safety and forward progress.

As a further example, scenarios can be provided for use in developing training data, such as for use in training one or more machine-learned models. For example, in some implementations, measuring scenarios can allow for determining variations in objects and/or events across scenarios and allow for developing more robust training data that can be used to train machine-learned models tasked with detecting and/or predicting such objects and/or events. In another example, scenarios can be provided for use in describing operational domains for one or more regions (e.g., cities, etc.) which can then be compared to identify different operational domains relevant to training machine-learned models to recognize objects and/or predicting behavior in one or more different regions.

In another example, in some implementations, scenarios can be provided to describe the behavior of autonomous vehicles within a region (e.g., city). For example, by measuring scenarios in a particular region (e.g., city), a description of the region as observed by the autonomous vehicles can be developed. Additionally, or alternatively, measuring scenarios in the region can provide for some understanding of how various actors (e.g., pedestrians, bicycles, other vehicles, etc.) generally operate in the region, the types of situations/events observed by the autonomous vehicles, and/or the like (e.g., the operational domain for the region). By developing descriptions of various regions, regions can be compared to one another in order to determine regions where scenarios may be similar/different or where autonomous vehicles may face similar/different challenges, for example, allowing for some predictions of autonomous vehicle performance in different regions based on the performance of autonomous vehicles in other regions.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for determining operating scenarios for an autonomous vehicle, the method comprising:
   obtaining, by a computing system comprising one or more computing devices, log data representing data describing a plurality of observations recorded during respective operation of a plurality of autonomous vehicles;
   extracting, by the computing system, a plurality of attribute combinations from the log data based on identifying co-occurring attributes respectively recorded from each of one or more of the autonomous vehicles;
   determining, by the computing system, a plurality of scenarios based on one or more of the attribute combinations identified during the extracting, wherein each of the scenarios includes multiple scenario variations that each comprise variation in at least one of multiple features associated with a respective scenario,
   wherein determining at least one of the scenarios is based, at least in part, on identifying a new combination of attributes occurring within the log data; and
   providing, by the computing system, the scenarios for generating autonomous vehicle operation analytics, wherein the scenarios comprise the at least one scenario based on the new combination of attributes occurring within the log data.

2. The computer-implemented method of claim 1, further comprising determining a distribution of feature values for each of the features in the scenarios based at least in part on comparing the multiple scenario variations.

3. The computer-implemented method of claim 1, wherein the log data is generated by each of one or more of the autonomous vehicles respectively during travel.

4. The computer-implemented method of claim 1, wherein the attributes comprise at least one attribute from each of at least two of:
   a vehicle maneuver;
   a lane geometry; or
   an object influencing the vehicle maneuver.

5. The computer-implemented method of claim 1, wherein each of the attributes for one or more of the attribute combinations is identified based on one or more co-occurring features in the log data.

6. The computer-implemented method of claim 1, wherein the determining of one or more of the scenarios is based, at least in part, on an occurrence frequency of a particular combination of attributes within the log data.

7. The computer-implemented method of claim 1, wherein one or more of the scenarios are used in generating autonomous vehicle operation simulations.

8. The computer-implemented method of claim 7, wherein the autonomous vehicle operation simulations are used in determining autonomous vehicle performance.

9. The computer-implemented method of claim 1, wherein one or more of the scenarios are used in machine-learned model training.

10. A computing system comprising:
    one or more processors; and
    a non-transitory memory including instructions that, when executed by the one or more processors, cause the one or more processors to perform operations comprising:
       obtaining log data representing data describing a plurality of observations recorded during respective operation of a plurality of autonomous vehicles;
       extracting a plurality of attribute combinations from the log data based on identifying co-occurring attributes respectively recorded from each of one or more of the autonomous vehicles;
       determining a plurality of scenarios based on one or more of the attribute combinations identified during the extracting, wherein each of the scenarios includes multiple scenario variations that each comprise variation in at least one of multiple features associated with a respective scenario,
       wherein determining at least one of the scenarios is based, at least in part, on identifying a new combination of attributes occurring within the log data; and
       providing one or more of the scenarios for generating autonomous vehicle operation analytics, wherein the scenarios comprise the at least one scenario based on the new combination of attributes occurring within the log data.

11. The computing system of claim 10, the operations further comprising:
    determining a distribution of feature values for each of the features in one or more of the scenarios based at least in part on comparing the multiple scenario variations.

12. The computing system of claim 10, wherein the attributes comprise at least one attribute from each of:
    a vehicle maneuver;
    a lane geometry; and
    an object influencing the vehicle maneuver.

13. The computing system of claim 10, wherein the log data is generated by each of one or more autonomous vehicles respectively during travel.

14. The computing system of claim 10, wherein the determining of one or more of the scenarios is based, at least in part, on a co-occurrence frequency of a particular combination of attributes within the log data.

15. The computing system of claim 10, wherein the one or more scenarios are used in generating autonomous vehicle operation simulations.

16. The computing system of claim 15, wherein the autonomous vehicle operation simulations are used in determining autonomous vehicle performance.

17. The computing system of claim 10, wherein the scenarios are used in generating machine-learned model training data.

18. One or more tangible, non-transitory computer-readable media storing computer-readable instructions that, when executed by one or more processors cause the one or more processors to perform operations comprising:

obtaining log data representing data describing a plurality of observations recorded during respective operation of one or more autonomous vehicles;

extracting a plurality of attribute combinations from the log data based on identifying co-occurring attributes respectively recorded from each of one or more of the autonomous vehicles;

determining one or more scenarios based on one or more of the attribute combinations identified during the extracting, wherein each of the scenarios includes multiple scenario variations that each comprise variation in at least one of multiple features associated with a respective scenario, wherein determining at least one of the scenarios is based, at least in part, on identifying a new combination of attributes occurring within the log data; and providing the one or more scenarios for generating autonomous vehicle operation analytics, wherein the scenarios comprise the at least one scenario based on the new combination of attributes occurring within the log data.

19. The non-transitory computer-readable media of claim 18, the operations further comprising determining a distribution of feature values for one or more of the features in the scenarios based at least in part on comparing the multiple scenario variations.

20. The non-transitory computer-readable media of claim 18, wherein the determining of one or more of the scenarios is based, at least in part, on a co-occurrence frequency of a particular combination of attributes within the log data.

* * * * *